United States Patent Office 3,576,784
Patented Apr. 27, 1971

3,576,784
FLAMEPROOFED CRYSTALLINE COPOLYMERS
OF PROPYLENE AND ETHYLENE
Walter E. Gloor, Wilmington, Del., assignor to
Hercules Incorporated, Wilmington, Del.
No Drawing. Filed Mar. 19, 1969, Ser. No. 808,695
Int. Cl. C08f 45/56
U.S. Cl. 260—45.75                                   4 Claims

ABSTRACT OF THE DISCLOSURE

This invention relates to flameproofed thermoplastic polymer compositions comprising (1) a crystalline copolymer of propylene and ethylene containing from 7–25% by weight of ethylene and having a melt flow rate (ASTM D-1238) less than 3; (2) a chlorinated flameproofing compound containing at least 50% by weight chlorine in an amount to provide from 11–16% by weight chlorine in the total composition; and (3) antimony oxide in the amount of 10–25% by weight of said copolymer, said composition being characterized by having a melt flow rate (ASTM D-1238) no higher than 2.2, a density no higher than 1.16, and a deflection temperature (ASTM D-648) at least as high as that of component (1).

---

The present invention relates to flame-retardant polymer compositions. More particularly, it relates to a flame-retardant composition comprising a high molecular weight crystalline copolymer of propylene and ethylene, a chlorinated flameproofing agent, and antimony trioxide.

The polyolefins, particularly polyethylene and stereoregular polypropylene, are widely used plastics which in their normal state are flammable. It has long been known, however, that such polyolefins can be rendered flame-retardant by the incorporation of certain additives, the most widely used of which comprise combinations of highly chlorinated compounds and antimony trioxide. Many different chlorinated compounds have been used successfully for such purpose including chlorinated aliphatic hydrocarbons such as chlorinated paraffin; chlorinated cycloaliphatic compounds such as chlorinated cyclopentadiene; tetrachlorophthalic anhydride, chlorinated dimer of hexachlorocyclopentadiene, tetrachlorophthalimide, octachlorodiphenylene dioxide, and chlorinated diphenylamine. As further illustrating the type of chlorinated additives employable in the present invention, reference is made to U.S. Pats. 2,590,211; 2,669,521; 3,340,226; 3,331,797; 3,025,262; 3,347,822; 3,158,588; 3,313,763; and 3,205,196.

It has also been recognized that the effect of flame-retardant additives in polyolefins, such as polyethylene and polypropylene, is much less when the molecular weight of the polyolefin is high. For example, a combination of additives which is capable of rendering a low molecular weight polyolefin self-extinguishing does not have as beneficial an effect in a high molecular weight polyolefin, the latter often supporting combustion. See, for example, Jolles, Trans. J. Plastics Inst., January 1967, page 3. Through the present day, the flameproofing of high molecular weight polyethylene and polypropylene has remained a problem.

The present invention is predicated on the discovery that known flameproofing combinations of chlorinated compounds and antimony trioxide are surprisingly effective in flameproofing high molecular weight crystalline copolymers of propylene and ethylene and also that the flameproofing additives do not drastically affect the high impact strength which is the hallmark of such copolymers. Further, the combination of additives is effective in quantities sufficiently low that the density of the total composition need be no higher than 1.16. In accordance with the aforesaid discovery, the invention relates to flameproof plastic compositions comprising (1) a crystalline copolymer of propylene and ethylene containing from 7–25% by weight of ethylene and having a melt flow rate (ASTM D-1238) less than 3; (2) a chlorinated flameproofing compound containing at least 50% by weight chlorine in an amount to provide from 11–16% by weight chlorine in the total composition; and (3) antimony oxide in the amount of 10–25% by weight of said copolymer, said composition being characterized by having a melt flow rate (ASTM D-1238) no higher than 2.2, a density no higher than 1.16, and a deflection temperature (ASTM D-648) at least as high as that of component (1).

The term "crystalline copolymer of propylene and ethylene" is used herein in the sense that such term is commonly employed in the art as meaning the homogeneous product of polymerization resulting from the sequential polymerization of (1) propylene and (2) a mixture of propylene and ethylene in the presence of a stereospecific polymerization catalyst. The most convenient method for making such compositions is to homopolymerize propylene in a liquid diluent to form a homopolymer and then introducing ethylene while there remains some unpolymerized propylene. At this point the polymerization continues as a copolymerization, and if the introduction of ethylene is continued past the stage at which the first monomer is exhausted, some homopolymerization of the ethylene will occur. In theory the product of such a process is intended to be composed of macromolecules in which one or more segments of the homopolymer of propylene (A) alternate with one or more segments of a copolymer of the propylene and ethylene (B), viz:

where $n$ equals an integer of one or more depending on the number of polymerization sequences. If polymerization of the second monomer is continued after the exhaustion of the first monomer, the theoretical repeating unit will have the structure

However, there is substantial evidence that the so-called "copolymer" is actually an intimate mixture of a homopolymer of propylene and a copolymer of propylene with ethylene and, optimally, homopolymer of ethylene, the mixture being homogeneous in the sense that there exists a uniform dispersion of the component polymers throughout the product, Hence, in using the term "copolymer" it is not intended to restrict the invention to polymeric compositions of true block copolymer structure, but it is intended to include the compositions commonly referred to as "block" copolymers even though such may not actually be the case.

Processes of producing the crystalline copolymers employed in this invention are described in, for example, British Pat. 970,478, and elsewhere. The crystalline copolymers employed in the invention are those in which 75 to 93% by weight is derived from propylene, and 7 to 25% by weight is derived from ethylene. Moreover, the crystalline copolymers employed in the invention have a high molecular weight as delineated by a melt flow rate less than 3 according to ASTM D-1238 employing a 2 kg. weight at a temperature of 230° C.

The chlorinated flameproofing compounds which are useful in the invention include all of those chlorinated compounds known to the art containing at least 50% chlorine which are capable, when used in combination with antimony trioxide, of rendering polyolefins nonburning. These include all of the chlorinated compounds previously mentioned as well as those referred to in the previously cited patents and other published literature.

The relevant amounts of crystalline copolymer, chlorinated compound and antimony trioxide are variable within fairly broad limits as previously defined.

The compositions of the invention are prepared by well-known methods. Preferably, the copolymer containing conventional stabilizers is blended with the chlorinated compound and antimony trioxide, and the resultant blend is extruded into pellets. The pellets are suitable for the production of articles by injection molding in a screw machine, extrustion, compression molding and the other known methods of fabrication.

The following examples are presented for purposes of illustration. In the examples all parts and percentages are by weight unless otherwise specified.

EXAMPLES

Different high molecular weight crystalline copolymers of propylene and ethylene were employed in the examples, and each was dry blended with varying amounts of a chlorinated compound and antimony trioxide. The dry mixture was then extruded into pellets, and test specimens for determination of flammability and other properties were molded according to the prescribed test procedures. In each case the copolymer contained conventional heat stabilizers. The compositions that were prepared and evaluated are described in the following table which shows relative parts of the copolymer and additives and gives the flammability, notched Izod impact and deflection temperature of each composition. As shown in the table each of the compositions prepared was nonburning and nondripping and possessed a high ratio of unnotched/notched impact strength and a high deflection temperature. The flameproof property was obtained despite the fact that the copolymers are of high molecular weight.

TABLE

| Composition | Controls | | | | | | Example Numbers | | | | | |
|---|---|---|---|---|---|---|---|---|---|---|---|---|
| | A | B | C | D | E | F | 1 | 2 | 3 | 4 | 5 | 6 |
| Homopolymer | 100 | | | | 100 | | | | | | | |
| Copolymer: | | | | | | | | | | | | |
| A | | 100 | | | | 100 | | | | | | |
| B | | | 100 | | | | 100 | | | 100 | 100 | |
| C | | | | 100 | | | | 100 | 100 | | | 100 |
| Chlorinated additive: | | | | | | | | | | | | |
| X | | | | | 44.75 | 44.75 | 38 | 38 | 34 | 34 | | |
| Y | | | | | | | | | | | 31.5 | |
| Z | | | | | | | | | | | | 34 |
| Sb$_2$O$_3$ | | | | | 21.75 | 21.75 | 19 | 19 | 17 | 17 | 23.6 | 17 |
| Properties—tested at 23° C.: | | | | | | | | | | | | |
| Melt flow i$_2$/230° C. (ASTM D1238) | 4 | 4 | 2 | 0.4 | 4-7 | 2.2 | 1.8 | 0.1 | 0.9 | 2.2 | 1.8 | 1.1 |
| Izod impact, notched (ASTM D256A) f.p./in. notch. | 0.4-0.6 | 1.5-4 | 2.5 minutes | 10 | 0.4 | 0.9 | 1.0 | 3.9 | 1.6 | 0.9 | 1.0 | 2.2 |
| Izod impact, unnotched, f.p./in. width. | 20.0 | (¹) | (¹) | (¹) | 3.0 | 8.3 | 16 | (¹) | 18 | 13 | 12.9 | 5.06 |
| Deflection temperature at 66 p.s.i. (ASTM D648) ° C. | 99 | 90 | 90 | 90 | 108 | 111 | 100 | 95 | 91 | 95 | 94 | 122 |
| Molded density, gram/cc | 0.904 | 0.904 | 0.904 | 0.902 | 1.189 | 1.175 | 1.156 | 1.151 | 1.113 | 1.119 | 1.154 | 1.128 |
| Flammability test (ASTM D635): | | | | | | | | | | | | |
| Burning | Yes | Yes | Yes | Yes | No | No | No | No | No—SE | No—SE | No | No—SE. |
| Drip observed | Yes | Yes | Yes | Yes | No | No | No | No | No | No | No | No. |
| Percent Cl in formulation, calculated | 0 | 0 | 0 | 0 | 17.5 | 17.5 | 15.6 | 15.6 | 14.5 | 14.5 | 12 | 11.5 |

NOTE.—Definitions in Table

Copolymer A=Cryst. copolymer of 75-78% C$_3$H$_6$ and 22.25% C$_2$H$_4$ having melt flow rate of 3-5.
B=Cryst. copolymer of 75-78% C$_3$H$_6$ and 22.25% C$_2$H$_4$ having melt flow rate of 1-2.9.
C=Cryst. copolymer of 75-78% C$_3$H$_6$ and 22.25% C$_2$H$_4$ having melt flow rate of 0.3-0.6.
Homopolymer=Polypropylene having melt flow rate of 3-5.
Additive X=Adduct of 2 moles of hexachlorocyclopentadiene with 1 mole of cyclooctadiene which compound is

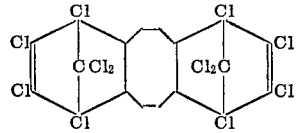

Additive Y=Adduct of 3 moles of hexachlorocyclopentadiene with 1 mole of

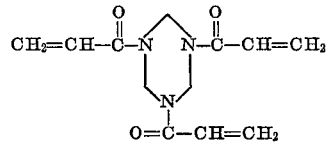

which compound is

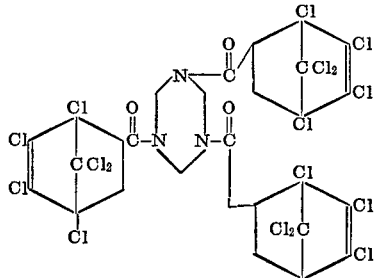

Additive Z=Adduct of 1 mole of hexachlorocyclopentadiene with 1 mole of

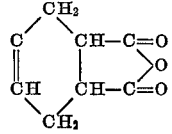

which compound is

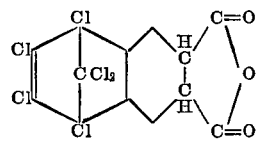

SE=Self-extinguishing.

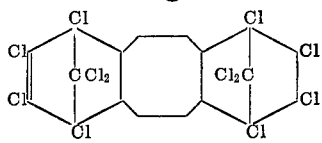

What I claim and desire to protect by Letters Patent is:

1. A flameproofed thermoplastic polymer composition comprising (1) a crystalline copolymer of propylene and ethylene containing from 7–25% by weight of ethylene and having a melt flow rate (ASTM D–1238) less than 3; (2) a chlorinated organic flameproofing compound containing at least 50% by weight chlorine in an amount to provide from 11–16% by weight chlorine in the total composition; and (3) antimony oxide in the amount of 10–25% by weight of said copolymer, said composition being characterized by having a melt flow rate (ASTM D–1238) no higher than 2.2, a density no higher than 1.16, and a deflection temperature (ASTM D–648) at least as high as that of component (1).

2. A composition of claim 1 in which the chlorinated

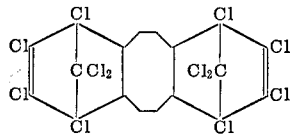

3. A composition of claim 1 in which the chlorinated

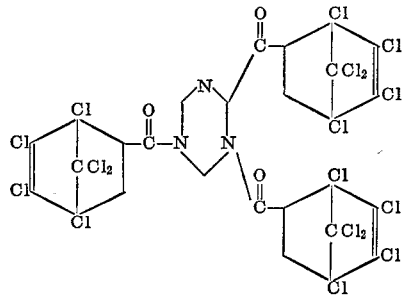

4. A composition of claim 1 in which the chlorinated

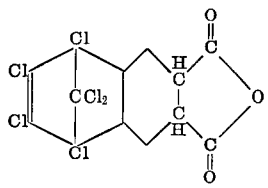

References Cited
UNITED STATES PATENTS

| | | | |
|---|---|---|---|
| 2,669,521 | 2/1954 | Bierly | 260—41 |
| 3,152,172 | 10/1964 | Roberts | 260—468 |
| 3,205,196 | 9/1965 | Chreighton | 260—45.75 |
| 3,313,763 | 4/1967 | Chreighton | 260—45.75 |
| 3,396,201 | 8/1968 | Weil | 260—45.75 |
| 3,418,263 | 12/1968 | Hindersinn | 260—45.75 |
| 3,470,177 | 9/1969 | Zimmerman | 260—45.8 |

DONALD E. CZAJA, Primary Examiner

V. P. HOKE, Assistant Examiner

U.S. Cl. X.R.

252—8.1; 260—28.5A, 41B, 45.7R, 45.8N, 45.8O, 45.85, 45.9R, 45.95

PO-1050
(5/69)

UNITED STATES PATENT OFFICE
CERTIFICATE OF CORRECTION

Patent No. __3,576,784__  Dated __April 27, 1971__

Inventor(s) __Walter E. Gloor (Case 44)__

It is certified that error appears in the above-identified patent and that said Letters Patent are hereby corrected as shown below:

In the Table in Columns 3 and 4, there is no explanation for " (1) " opposite -- Izod impact, unnotched, f.p./in. width -- in Columns B, C, and D under Controls and Column 2 under Example Numbers. A footnote should be inserted to read -- did not break --.

In line 2 of Claims 2, 3 and 4, " compound is " should be inserted before the formula.

Signed and sealed this 14th day of September 1971.

(SEAL)
Attest:

EDWARD M. FLETCHER, JR.
Attesting Officer

ROBERT GOTTSCHALK
Acting Commissioner of Paten